United States Patent
Suefuji

(10) Patent No.: US 9,447,885 B2
(45) Date of Patent: Sep. 20, 2016

(54) DOUBLE MECHANICAL SEAL DEVICE

(71) Applicant: EAGLE INDUSTRY CO., LTD., Tokyo (JP)

(72) Inventor: Yoshihiro Suefuji, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/389,216

(22) PCT Filed: Jun. 25, 2013

(86) PCT No.: PCT/JP2013/067306
§ 371 (c)(1),
(2) Date: Sep. 29, 2014

(87) PCT Pub. No.: WO2014/030423
PCT Pub. Date: Feb. 27, 2014

(65) Prior Publication Data
US 2015/0159759 A1    Jun. 11, 2015

(30) Foreign Application Priority Data

Aug. 22, 2012   (JP) ................................ 2012-183277

(51) Int. Cl.
    *F16J 15/34*          (2006.01)
    *F16J 15/36*          (2006.01)

(52) U.S. Cl.
CPC ......... *F16J 15/3484* (2013.01); *F16J 15/3464* (2013.01); *F16J 15/36* (2013.01); *F16J 15/363* (2013.01)

(58) Field of Classification Search
CPC .. F16J 15/3436; F16J 15/3452; F16J 15/346; F16J 15/36; F16J 15/363
See application file for complete search history.

(56) References Cited

U.S. PATENT DOCUMENTS 2,100,220 A   *   11/1937   King ................................ 277/391
2,758,856 A   *    8/1956   Payne et al. .................. 277/392
(Continued)

FOREIGN PATENT DOCUMENTS

CN       102072321       5/2011
JP        S55-27565 A    2/1980
(Continued)

OTHER PUBLICATIONS

Chinese office action dated Jul. 10, 2015, corresponding application.
International Search Report for PCT/JP2013/067306, ISA/JP, mailed Sep. 3, 2013.
Corresponding CN 2nd office action dated Feb. 15, 2016.

*Primary Examiner* — Kristina Fulton
*Assistant Examiner* — Nicholas L Foster
(74) *Attorney, Agent, or Firm* — Harness, Dickey & Pierce, PLC

(57) ABSTRACT

A double mechanical seal device, comprising a rotating ring, a first static ring, a second static ring, and a seal cover. A first bellows seal device is provided between the first static ring and the seal cover, and the first bellows seal device comprises a first bellows part capable of expanding and contracting in an axial direction, a first cover-side adapter, and a first static ring-side adapter. The first bellows seal device and the first static ring are disposed so that in a state where there is no pressure difference between the inside and outside of the first bellows part, a balance line of the first bellows part passes through a cross section of an O ring and a first static seal surface.

4 Claims, 4 Drawing Sheets

(56) References Cited

U.S. PATENT DOCUMENTS

| | | | |
|---|---|---|---|
| 5,924,697 A * | 7/1999 | Parker et al. | 277/369 |
| 6,338,489 B1 * | 1/2002 | Nakano | 277/385 |
| 8,800,995 B2 | 8/2014 | Suefuji | |
| 2003/0006560 A1 * | 1/2003 | Dahlheimer | 277/389 |
| 2011/0037232 A1 * | 2/2011 | Suefuji | 277/379 |
| 2012/0139186 A1 * | 6/2012 | Suefuji | 277/377 |
| 2015/0240950 A1 * | 8/2015 | Takahashi | 277/377 |
| 2016/0003361 A1 * | 1/2016 | Takahashi | F16J 15/342 277/377 |
| 2016/0003362 A1 * | 1/2016 | Suefuji | F16J 15/348 277/377 |

FOREIGN PATENT DOCUMENTS

| | | |
|---|---|---|
| JP | S59-141103 U | 9/1984 |
| JP | H03-98375 U | 10/1991 |
| JP | H03-105771 U | 11/1991 |
| JP | H04-30366 U | 3/1992 |
| JP | H7-25368 U | 5/1995 |
| WO | WO-2010/123025 A1 | 10/2010 |

\* cited by examiner

DOUBLE MECHANICAL SEAL DEVICE

CROSS-REFERENCE TO RELATED APPLICATIONS

This application is a 371 U.S. National Stage of International Application No. PCT/JP2013/067306, filed Jun. 25, 2013, which claims priority to Japanese Patent Application No. 2012-183277, filed Aug. 22, 2012. The disclosures of the above applications are incorporated herein by reference.

TECHNICAL FIELD

The present invention relates to a double mechanical seal device.

BACKGROUND ART

For the mechanical seal used as the shaft seal to a centrifugal pump or so, the inside of the stuffing box of which the mechanical seal is provided will temporarily be negative pressure upon starting, hence this causes the condition having no liquid on the sliding face of the mechanical seal, and may cause a burning or breaking of the sliding face.

In order to solve such problems, conventionally the double mechanical seal (it may be simply referred as the double seal) is used in some cases. In the double mechanical seal, by flowing the quenching liquid between the two seals, it prevents the sliding face from drying. Also, the double seal is frequently used in case the liquid is not to leak out to the inner device side, or in case the liquid of the inner device side becomes crystallized by drying or so.

For example, as shown in the below patent article 1, the double mechanical seal combining the bellows is known. However, such conventional double mechanical seal comprises the rotary ring per each mechanical seal, and the rotary rings are arranged at two positions along the axis direction of the rotary shaft, therefore the constitution of the device in the axis direction was long, and it did not satisfy the demand of making it more compact.

Also, for the double mechanical seal with the conventional bellows, the stationary ring has a constitution of shrink-fitting to the retainer (the adaptor), thus in case the inner side pressure of the bellows is high, there is a risk that the sealed fluid leaking between the stationary ring and the retainer. Also, for the conventional double mechanical seal with the bellows, as the stationary ring has the constitution of shrink-fitting to the retainer (the adaptor), in case the pressure difference between the outside and the inside of the stationary ring is reversed, the adhesive force working toward the seal face between the stationary ring and the rotary ring significantly changes. Therefore, in case the pressure difference between the inside and the outside of the bellows is reversed, it is necessary to change the design of the double mechanical seal with the bellows (such as spring force of the bellows or so), and it is necessary to prepare the different double mechanical seal depending on the pressure difference atmosphere.

PRIOR ART DOCUMENT

Patent document 1: JP Patent Application Laid Open No. 2011-7239

DISCLOSURE OF THE INVENTION

Technical Problems to be Solved by the Invention

The present invention has been accomplished in view of such situation, and the object of the present invention is to provide the double mechanical seal device which has compact device constitution, and capable of sealing by using common devices even in case the pressure difference between the inside and the outside of the bellows is reversed.

Means for Solving the Technical Problems

In order to accomplish the above object, the double mechanical seal device according to the present invention comprises, a rotary ring provided with a rotary shaft so as to rotate as one body with said rotary shaft, and having rotating seal faces formed at both faces of said rotary ring along an axis direction, a first stationary ring provided at an inner device side of said rotary ring, and formed with a first stationary seal face sliding against said rotating seal face at the inner device side of said rotary ring, a second stationary ring provided at an outer device side of said rotary ring, and formed with a second stationary seal face sliding against said rotating seal at the outer device side of said rotary ring, and a seal cover attached to an outer face of an installation having said rotary shaft penetrating therethrough, and housing said first stationary ring, said rotary ring, and said second stationary ring at an inner peripheral side; wherein a first bellows seal equipment is provided between said first stationary ring and said seal cover, said first bellows seal equipment comprising, a first bellows part extendable in an axis direction, a first cover side adaptor wherein one end of said first bellows part is fixed in a liquid sealed manner, and installed in a liquid sealed manner to a first inner projection part of said seal cover via a first cover side seal member, and a first stationary ring side adaptor wherein other end of said first bellows part is fixed in a liquid sealed manner, and installed against said first seal ring in liquid sealed manner via said first stationary ring side seal member so that the first stationary ring side adaptor can make a relative movement in an axis direction; and wherein said first bellows device and said first ring are arranged so that a balance line of said first bellows part passes through said first stationary seal face while there is no pressure difference generated between an inside and an outside of said first bellows part.

In the present invention, since it takes the constitution wherein the mechanical seal is arranged at both sides of the single rotary ring along the axis direction, the outer peripheral of the rotary ring can be the sealing space of the quenching liquid, and it can prevent the sliding face from drying. Also, due to two mechanical seals, the leaking can be prevented almost completely.

Further, in the present invention, the double mechanical seal device has a constitution wherein the single rotary ring where the rotating seal face is formed at both faces of the axis direction, hence the constitution of the device is compact. Further, in the present invention, between the first stationary ring and the seal cover, the first bellows seal equipment is provided, thus even if the fluid which solidifies the seal members such as operational O ring or so is used as the sealed fluid, due to the extension and shrinking of the first bellows, the axis direction movement of the first stationary ring can be absorbed, hence it has an effect to elongate the lifetime of the mechanical seal.

Further, in the present invention, the first stationary ring and the first stationary ring side adaptor are arranged in a liquid sealed manner via the first stationary ring side seal member, so that it can make relative movement in the axis direction; and further the balance line of the first bellows part passes through said first stationary seal face; thus the following effects can be exhibited.

That is, in the present invention, even in case the pressure of the sealed fluid is higher than the fluid pressure (the quenching pressure) at the outside of the first bellows, or even if it is the opposite of this, it is possible to have a structure that a first stationary ring is constantly pressed against the rotary ring. Therefore, even if the fluid pressure (the quenching pressure) at the outside of the first bellows is higher than the pressure of the sealed fluid, or even if it is the opposite of this, it is possible to use the common double mechanical seal device. Hence it is possible to share the parts, thus it can be used in a wide range thus it is excellent for general purpose use.

Preferably, said first bellows equipment and the first stationary ring are arranged at the position where the balance line of said first bellows part passes through a cross section of said first stationary ring side seal member and near the radial direction center of the cross section, while there is no pressure difference between the inside and the outside of said first bellows part.

By maintaining such arrangement, even if the pressure of the sealed fluid is higher than the fluid pressure (the quenching pressure) of the outside of the first bellows, or even if it is the opposite of this, a structure wherein the first stationary ring is constantly pressed against the rotary ring is easy to obtain.

Preferably, the width of the radial direction of said first stationary seal face is narrower than the width of the radial direction of said rotating seal face. By taking such relation, the friction between these seal faces against each other can be reduced, while improving the seal characteristic.

Preferably, a spring is arranged at the outside of said first bellows part and in between said first stationary ring side adaptor and said first inner projection part, to provide the force pressing a first stationary seal face of said first stationary ring to said rotating seal face towards the axis direction via said first stationary ring side adaptor.

In this case, it can take a constitution wherein the spring is attached to the seal cover along the axis direction where the first bellows part extends and contracts, thus the pressing force of the first stationary ring against the rotary ring can be secured by the pressing force of the spring. Thus, the first bellows part can be arranged at inside of the device nearby the free length. Therefore, the size in the axis direction can be made smaller than the conventional bellows (the numbers of the ridges of the bellows can be made lesser), thus the production cost of the bellows can be suppressed, and also the mechanical seal device can be made compact.

Preferably, the bellows is made of metal. By taking such constitution, the corrosion of the bellows against special liquids such as chemical agents or so can be prevented. The metal constituting the bellows is not particularly limited, for example it is produced from any one of an alloy such as stainless, Inconel, hastelloy, carpenter or so or titanium or so.

Preferably, a second bellows seal equipment is provided between said first second stationary ring and said seal cover,
said second bellows seal equipment comprises
a second bellows part extendible in an axis direction,
a second cover side adaptor wherein one end of said second bellows part is fixed in a liquid sealed manner, and installed to a second inner projection part of said seal cover member in a liquid sealed manner via a second cover side seal member, and a second stationary ring side adaptor wherein other end of said second bellows part, and installed to said second stationary ring in a liquid sealed manner via a second stationary ring side seal member so that the second stationary ring side adaptor can make relative movement in an axial direction; and wherein said second bellows device and said second stationary ring are arranged so that a balance line of said second bellows part passes through said second stationary seal face while there is no pressure difference generated between an inside and an outside of said second bellows part.

By taking such constitution, a pair of mechanical seal arranged at both sides of the axis direction of the rotary ring can have same constitution, and the parts can be shared as well.

BEST MODE FOR CARRYING OUT THE INVENTION

Hereinafter, the embodiments shown in the figures will be explained.

In the present embodiment, the seal device as an example is used as the shaft seal of the centrifugal pump, and has double seal constituted by having two sliding faces opposing back to back, and installed to the outer face of the stuffing box as the cartilage form. Note that, the seal device of the present invention may be directly attached to the outer face of the casing such as the pump or so in the cartilage form without using the stuffing box.

Figure 1:
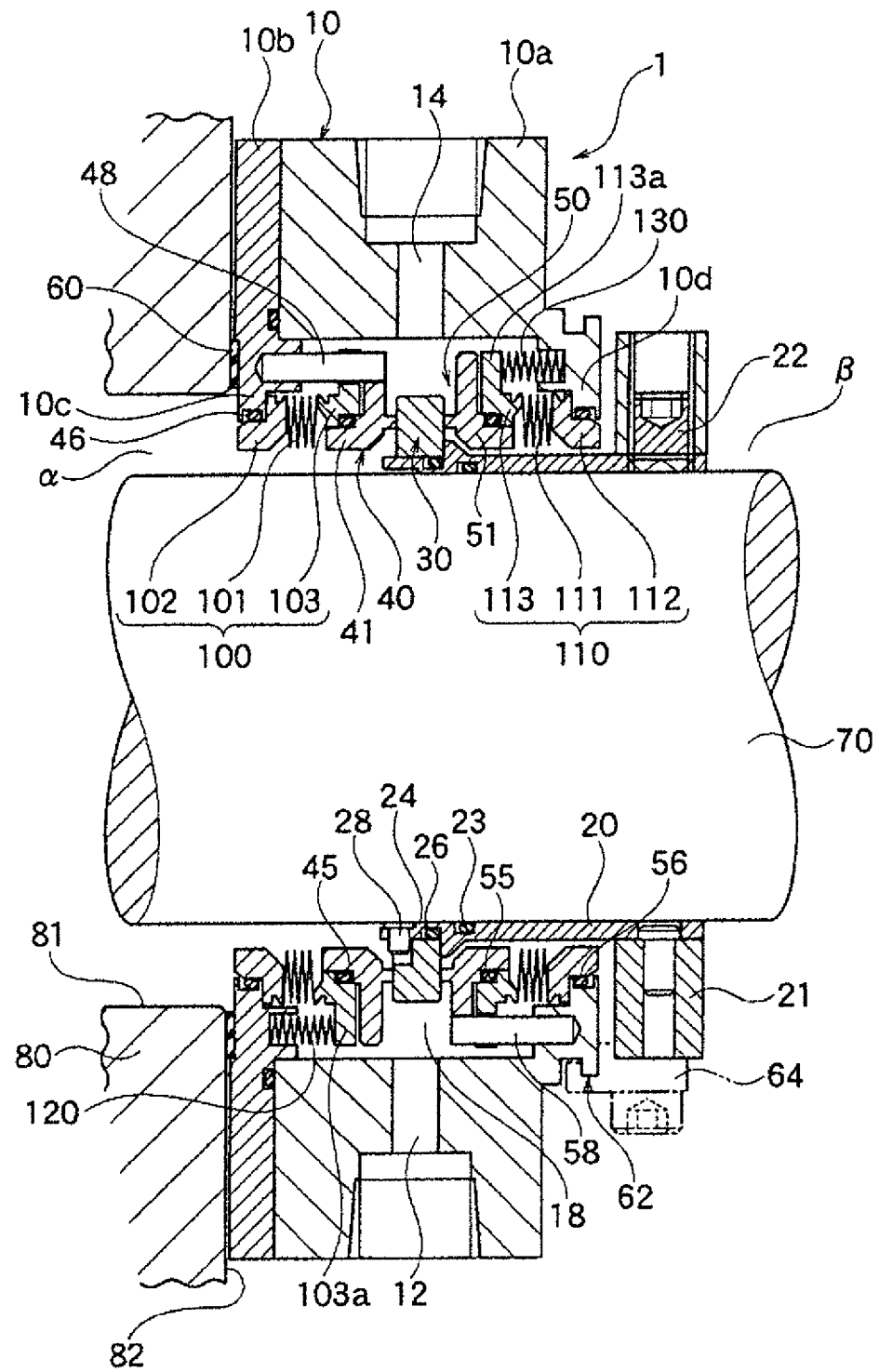
FIG. 1 is a schematic cross section of the double mechanical seal device according to one embodiment of the present invention.

As shown in FIG. 1, the staffing box 80 of the centrifugal pump is formed with shaft hole 81, and to this shaft hole 81, the rotary axis 70 supported by a bearing which is not shown in the figure penetrates through. The double mechanical seal device 1 according to the present embodiment comprises the seal cover 10, and this seal cover 10 is attached to the outer face 82 which is the surrounding of the shaft hole 81 of the stuffing box in a removable manner by the embedded bolts or so to said outer face 82.

Note that, in the FIG. 1, the shaft hole 81 side of the stuffing box 80 (the left side of the figure) is the inner device side space α, and the opposite side in the axis direction (the right side of the figure) is the outer device side (3 which is the atmosphere side. In the present embodiment, the seal cover 10 comprises a cover main body 10a formed with the quenching liquid entering site 12 and the quenching liquid exiting site 14, and the supporting cover 10b arranged between the cover main body 10a and the outer face 82 of the stuffing box 80.

At the inner peripheral side of the supporting cover 10b, the first inner projection part 10c is formed, and the stationary part of the first mechanical seal 40 is attached against this first inner projection part 10c. Also, at the outer device side inner peripheral part of the cover main body 10a, the second inner projection part 10d is formed, and the stationary part of the second mechanical seal 50 is attached against this second inner projection part 10d.

The seal device 1 of the present embodiment comprises the rotary ring 30 fixed to the sleeve 20 of the rotary shaft 70. The sleeve 20 is closely fit to the peripheral face of the rotary shaft 70 by having the O ring 23 in between, and at the outer device side end part of the sleeve 20, it is fixed to the rotary shaft 70 by a sleeve collar 21.

The sleeve collar 21 fits to the outer peripheral of the outer device side end part of the sleeve 20, and is fixed against the rotary shaft 70 by set screw 22. Thereby, the sleeve 20 and the sleeve collar 21 are fixed to the rotary shaft 70 as one body. The rotary ring 30 is fit to the inner device side end part 24 of this sleeve 20.

At the inner device side end part 24 of the sleeve 20, the rotary ring 30 is attached in a sealed manner via the O ring 26, and the whirl-stop is done against the rotary shaft 70 by a knock-pin 28. Thereby, the rotary ring 30 is made to rotate together with the rotary shaft 70.

At the inner device side of the rotary rig 30, the stationary part of the first mechanical seal 40 is arranged, and at the atmosphere side of the rotary ring 30, the stationary part of the second mechanical seal 50 is arranged. The rotary ring 30 of the present embodiment is a rotary part of the first mechanical seal 40, and also it is a rotary part of the second mechanical seal part 50.

Figure 3:
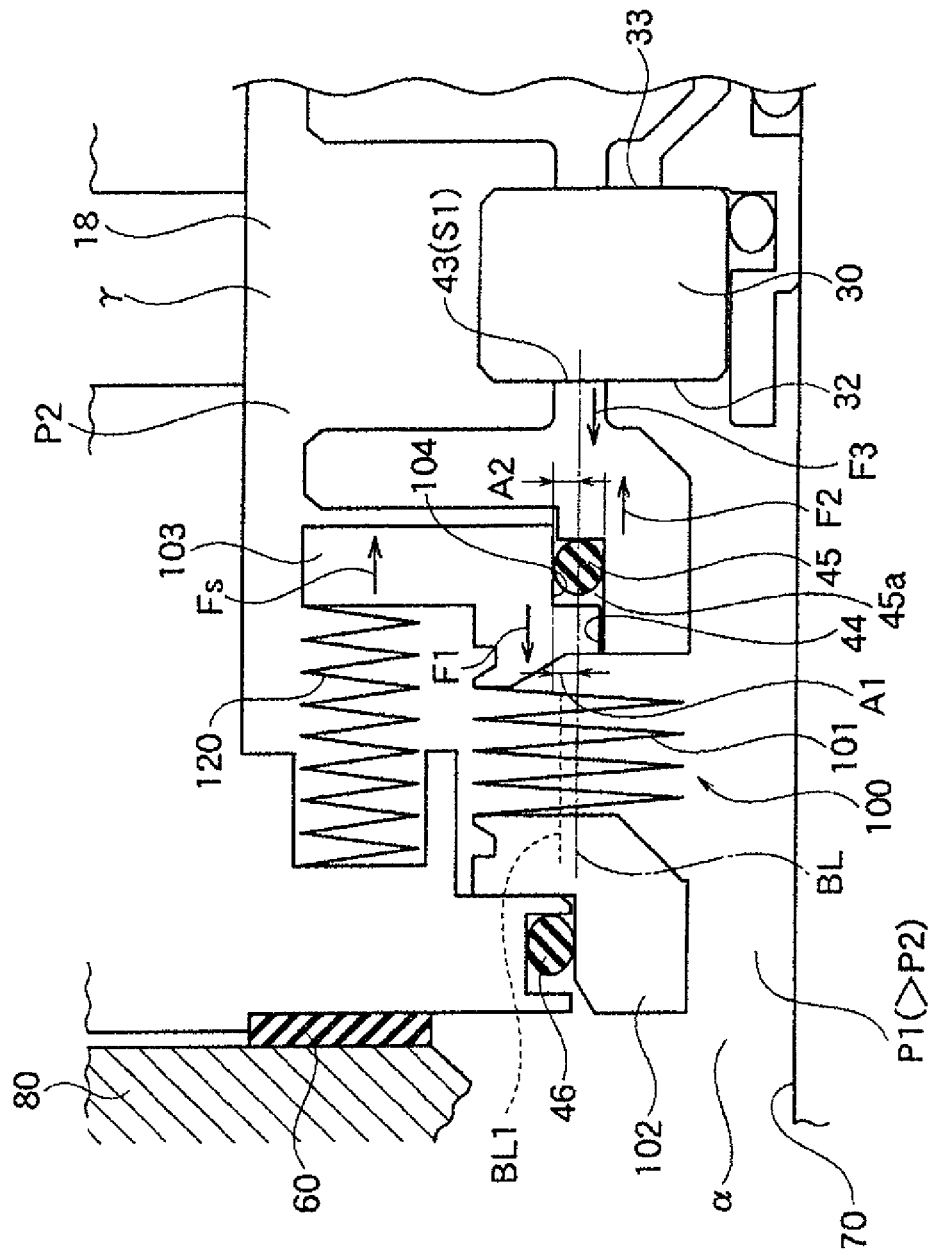
FIG. 3 is a schematic cross section of the essential part showing the condition that the sealed fluid pressure is high in the device shown in FIG. 1.
Figure 4:
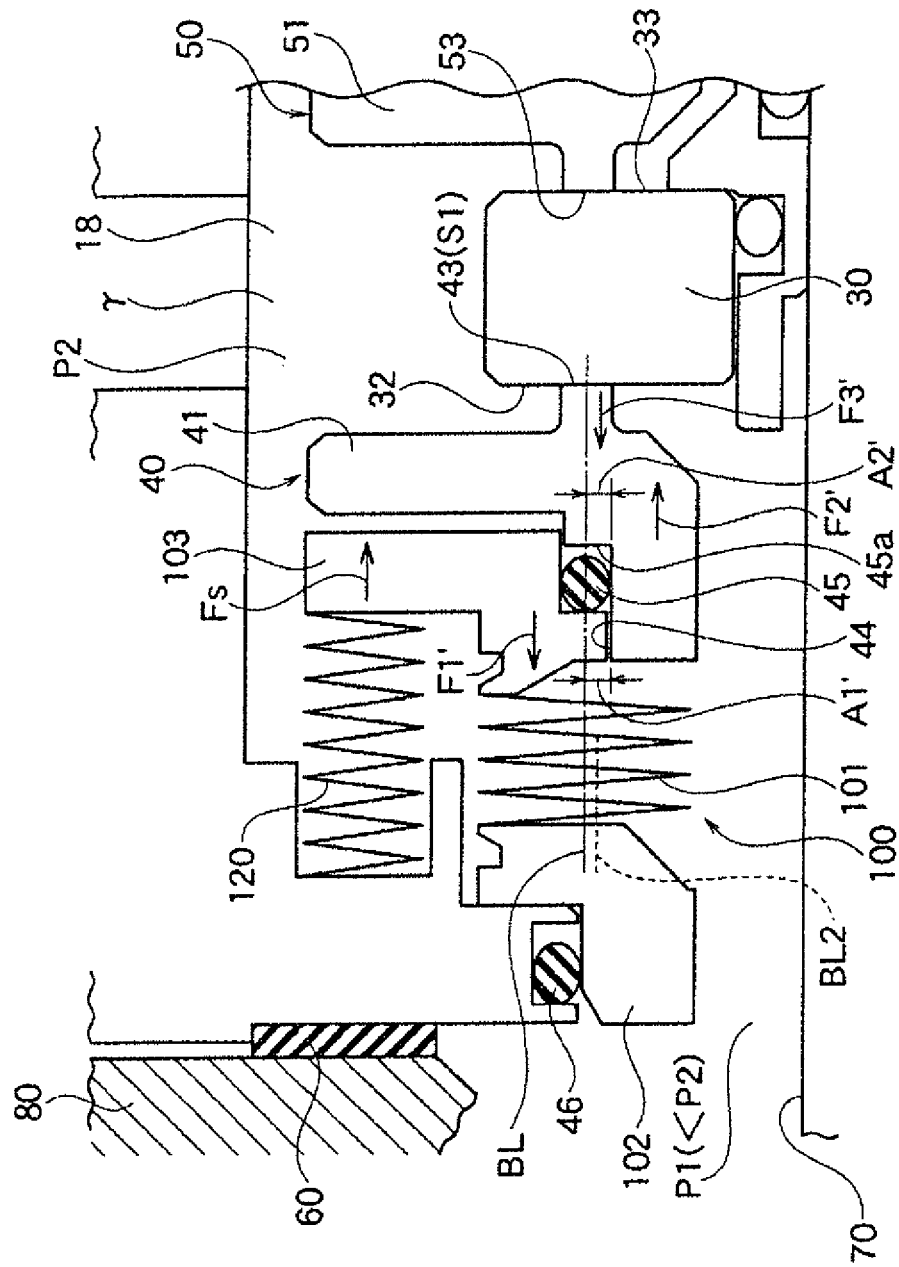
FIG. 4 is a schematic cross section of the essential part showing the condition that the quenching liquid pressure is high in the device shown in FIG. 1.

At the both faces along the axis direction of the rotary ring 30, the inner device side rotating seal face 32 and the atmosphere side rotating seal face 33 are formed as shown in FIG. 3 and FIG. 4. At the inner device side rotating seal face 32, the first stationary seal face 43 of the first stationary ring 41 of the first mechanical seal 40 slides, and at the atmosphere side rotating seal face 33; the second stationary seal face 53 of the second stationary ring 51 of the second mechanical seal 50 slides.

As shown in FIG. 1, the first mechanical seal 40 comprises the first stationary ring 41, the first bellows seal equipment 100, and the spring 120. Similarly, the second mechanical seal 50 comprises the second stationary ring 51, the second bellows equipment 110 and the spring 130.

The seal cover 10 is provided so that it covers the outer peripheral part of the first mechanical seal 40 and the second mechanical seal 50, and the sealed intermediate room 18 is formed between these seal device 40 and 50. The quenching liquid entering site 12 and the exiting site 14 formed at the casing main body 10a is connected with the intermediate room 18, and the quenching liquid flowing in from the entering site 12 runs the outer peripheral part of these seal device 40 and 50, and after washing and cooling these seal device 40 and 50, the quenching liquid is discharged from the exiting site 14.

The first bellows seal equipment 100 comprises the first bellows part 101 extendable in the axis direction. The inner device side end of the first bellows part 101 is fixed in a liquid sealed manner against the first cover adaptor 102 by welding or so. This first cover side adaptor 102 is installed to the first inner projection part 10c of the supporting cover 10b via the first cover side O ring 46 in a liquid sealed manner.

The outer device side end of the first bellows part 101 is fixed to the first stationary ring side adaptor 103 by welding or so in a liquid sealed manner. This first stationary ring side adaptor 103 is installed against the first stationary ring 41 via the first stationary ring side O ring 45 in a liquid sealed manner and so that it is possible to make relative movement in the axis direction.

At the outer peripheral part of the first bellows equipment 100 and the first stationary ring 41 and also at the inner peripheral side of the cover main body 10a, the spring 120 and the fixing pin 48 are arranged in an alternating manner along the circumference direction. One end of the inner device side of the spring 120 is supported by the spring supporting hole which is formed at the inner projection 10c of the supporting cover 10b. The other end of the spring 120 is in contact with the back face of the outer flange 103a of the first stationary ring side adaptor 103. Therefore, the spring 120 presses the adaptor 103 toward the axis direction of the rotary ring 30 together with the first stationary ring 41.

One end of the inner device side of the fixing pin 48 is fixed against the first inner projection 10c of the supporting cover 10b, and other end of the fixing pin engages with the notch formed at the outer peripheral flange 103a of the first stationary ring side adaptor 103 and the notch formed at the outer peripheral flange of the first stationary ring 41; thereby the whirl-stop thereof are done.

The second bellows seal equipment 110 comprises the second bellows part 111 extendable in the axis direction. The outer device side end of the second bellows part 111 is fixed against the second cover side adaptor 112 by welding or so in a liquid sealed manner. This second cover side adaptor 112 is installed to the second inner projection part 10d of the cover main body 10a via the second cover side O ring 56 in a liquid sealed manner.

The inner device side end of the second bellows part 111 is fixed against the second stationary ring side adaptor 113 by welding or so in a liquid sealed manner. This second stationary ring side adaptor 113 is installed against the second stationary ring 51 via the second stationary ring side O ring 55 in a liquid sealed manner so that it can make relative movement in an axis direction.

At the outer peripheral part of the second bellows equipment 110 and the second stationary ring 51 and at the inner peripheral side of the cover main body 10a, the spring 130 and the fixing pin 58 are arranged in an alternating manner along the circumference direction. One end of the outer device side spring 130 is supported by the spring supporting hole formed at the inner projection part 10d of the cover main body 10a, and other end of the spring 130 is in contact with the back face of the outer peripheral flange 113a of the second stationary ring side adaptor 113. Therefore, the spring 130 presses the adaptor 113 to the axis direction of the rotary ring 30 together with the second stationary ring 51.

One end of the outer device side of the fixing pin 58 is fixed against the inner projection part 10d of the cover main body 10a, and other end of the fixing pin engages with the notch formed at the outer peripheral flange 113a of the second stationary ring side adaptor 113, and the notch formed at the outer peripheral flange of the second stationary ring 51; thereby the whirl-stop thereof is done.

The first mechanical seal 40 and the second mechanical seal 50 are arranged symmetrically along the axis direction across the rotary ring 30 in between. In the below description, the first mechanical seal 40 will be mainly explained, however the same is applied to the second mechanical seal 50.

Note that, in the FIG. 1, in between the supporting cover 10b of the seal cover 10 and the outer face 82 of the stuffing box 80, the gasket 60 is arranged at the inner peripheral side, thereby the sealed fluid present in the inside of the inner device side does not leak from the space between the supporting cover 10b and the outer face 82. Also, at the outer device side end part of the cover main body 10a, the positioning part 62 is formed.

When providing the sleeve 20 or the rotary ring 30 to the rotary shaft 70, the projection part of the set plate 64 is fit to the positioning groove as the positioning part 62, then the sleeve collar 21 is provided to the rotary shaft 70 while the set plate 64 is placed therebetween. Thereby, the seal cover 10, the sleeve collar 21 and the sleeve 20 are set to a predetermined position, and as a result, the rotary ring 30, the first stationary ring 41 and the second stationary ring 51 are respectively set to a predetermined position. After being set, the set plate 64 is removed for use.

Figure 2:
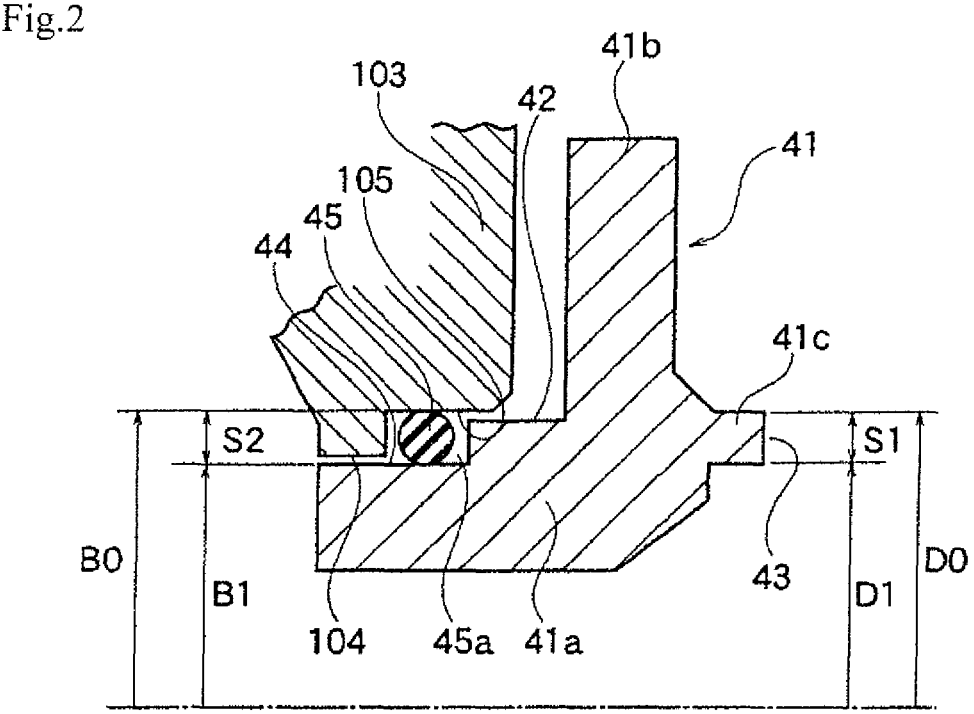
FIG. 2 is an enlarged cross section of the essential parts shown in FIG. 1.

As shown in FIG. 2, the stationary ring 41 comprises the stationary ring main body 41a having a ring form. At the outer peripheral part of the stationary ring main body 41a, the outer peripheral flange 41b having a disk form is formed as one body at the outer radial direction. At the intercepting point between the outer peripheral flange 41b and the stationary ring main body 41a, the projection part 41c is formed which is projecting out to the axis direction toward the rotary ring 30 shown in FIG. 1, and at this projection part 41c, the first stationary seal face 43 is formed.

Also, at the connecting outer peripheral face 42 with the first stationary ring side adaptor 103 in the first stationary ring 41, the outer peripheral face for O ring contact 44 having a small step form is formed of which the diameter is smaller than this outer peripheral face 42. At the connecting inner peripheral face 104 with the first stationary ring 41 of the first stationary ring side adaptor 103, the inner peripheral face for O ring contact 105 having small step form is formed of which the diameter is smaller than this inner peripheral face 104.

The connecting outer peripheral face 42 of the first stationary ring 41 fits to the inside part of the inner peripheral face for O ring contact 105 having a step form of the first stationary ring side adaptor 103; and the outer peripheral face for O ring contact 44 having a step form of the first stationary ring 41 fits to the connecting inner peripheral face 10 of the first stationary ring side adaptor 103. Therefore, at these connecting faces, the O ring groove 45a for housing the O ring 45 is formed, the O ring is deformed by being compressed between the inner peripheral face for O ring contact 105 and the outer peripheral face for O ring contact 44, and thereby the space therebetween is sealed.

In the present embodiment, in the first stationary ring 41, regarding the O ring groove 45a provided with the O ring 45, the outer diameter B1 of the outer peripheral face for O ring contact 44 having the step form and the inner diameter D1 of the stationary ring seal face 43 is designed to be approximately the same. Also, the inner diameter B0 of the inner peripheral face for the O ring contact 105 having the step form and the outer diameter D0 of the first stationary face 43 are also designed to be approximately the same. By having such constitution, the area S1 of the first stationary seal face and the transverse section area S2 of the compressing direction of the O ring 45 in the O ring groove 45a are approximately the same.

Note that, as for the material of the O ring 45 and other O ring, it is not particularly limited, and for example fluorine rubber, nitrile rubber, EPDM, perfluoroelastomer or so may be mentioned.

Also, as shown in FIG. 1, the inner peripheral face side of the first stationary ring 41 is formed with a relatively large space between the outer peripheral face of the rotary shaft 70, and even if the sealed fluid housed in the inner device side space α includes slurry, it is formed so that this sealed fluid does not clog due to the solidification or so.

In the stationary ring 41 of the present embodiment, the face width (the length of the radial direction) of the first stationary seal face (the sliding face) 43 is formed to be 3 mm or less. Preferably, it is 1 mm to 3 mm. Also, depending on the case, the first stationary seal face 43 may be an embodiment projecting out in a triangular shape at the tip in the inner device rotating seal face 32 direction of the rotary ring 30.

As such, by making the face width of the first seal face 43 narrower than usual, in case the pressure of the coil spring 120 pressing the first stationary ring 41 towards the rotary ring 30 direction is the same, the face pressure between the first stationary seal face 43 and the inner device side rotating seal face 32 can be increased. In other words, in case of obtaining the same face pressure (the seal face pressure), by making the seal face width narrower, it is possible to make the pressing force of the coil spring 120 smaller, thus a small spring as the coil spring 120 can be used. As a result, by reducing the seal face pressure, the small spring can be used, and the seal device 1 can be made compact.

Also, in the present embodiment, as shown in FIG. 3 and FIG. 4, the first bellows equipment 100 and the first stationary ring 41 are arranged so that the balance line BL of the first bellows part 101 passes through the O ring groove 45a and the first stationary seal face 43 while there is no pressure difference between the inside and the outside of the first bellows part 101.

Preferably, the first bellows equipment 100 and the first stationary ring 41 are arranged so that the balance line BL passes through the approximate center of the radial direction of the O ring groove 45a and the approximate center of the radial direction of first stationary seal face 43. When it is in such arrangement, it will be referred that the balance value is 50%. Note that, the position of 0% balance value refers when the balance line BL is at the position of D1 shown in FIG. 2 in case of P1>P2, and at the position of D0 shown in FIG. 2 in case of P1<P2; and the position of 100% balance value refers when the balance line BL is at the position of D0 shown in FIG. 2 in case of P1>P2, and at the position of D1 shown in FIG. 2 in case of P1<P2.

Note that, in the present embodiment, the balance line BL of the bellows part 101 is the line connecting the center of the radial direction at the bellows form portion of the bellows part 101, and it is the line matching mainly to the point of action of the force acting by the extension and contraction of the bellows part 101. The balance line BL varies due to the pressure differences between the internal peripheral and the outer peripheral of the bellows part 101.

For example, as shown in FIG. 3, in case that the pressure P1 (the pressure at the inner peripheral side of the bellows part 101) of the sealed fluid present at the inner device side space α is higher than the pressure P2 (the pressure at the outer peripheral side of the bellows part 101) at the inside of the intermediate room 18, the balance line BL moves to the outer peripheral side as shown by the balance line BL1. Also, as shown in FIG. 4, in case that the pressure P1 of the sealed fluid present at the inner device side space α is lower than the pressure P2 at inside of the intermediate room 18, the balance line BL moves to the inner peripheral side as shown by the balance line BL2.

As shown in FIG. 3, in case of P1>P2, the O ring 45 moves in the inside of the O ring groove 45a and is pressed against the step form wall face of the first stationary ring 41 due to the pressure P1. Therefore, at the first stationary ring side adaptor 103, the force F1, wherein the pressure difference (P1–P2) multiplied by the cross sectional area A1 corresponding to the radial direction width from the balance line BL (or BL1) to the inner peripheral face for O ring contact 104 having a step form, acts towards the direction compressing the bellows part 101. The spring force Fs of the spring 120 is designed so that the spring 120 is larger than the force F1; hence there is no problem in this regard.

Also, at the first stationary ring 41, the force F2 (=F1), wherein the pressure difference (P1−P2) multiplied by the cross sectional area A2 (=A1) corresponding to the radial direction width from the balance line BL (or BL1) to the inner peripheral face for O ring contact 104 having a step form, acts so that the first stationary ring 41 is compressed towards the rotary ring 30.

Note that, at the sliding face between the seal face 43 and the seal face 32, the force acting in a direction to release the first stationary ring 41 from the rotary ring 30 is acted on, by the force F3 which is provided by the equation of S1×(P1−P2)/2, taking the area S1 of the seal face having a smaller area than the seal face 32 as the standard. As discussed in above, the force F2 and the force F3 are approximately the same, and depending on the pressure difference (P1−P2), there may be no force in the axis direction acting on the first stationary ring 41.

As shown in FIG. 3, the same applies even in case the balance line changes to the outer peripheral direction. This is because, if the balance line BL changes towards the outer peripheral direction and is at the position of balance line BL1, the area A1 becomes smaller thus the increased pressure difference (P1−P2) can be canceled out, hence the force F1 does not change significantly between before and after the balance line change.

Regarding the force F2, it does not change significantly between before and after the balance line change due to the same reason. Only the force F3 changes to increase in correspondence to (P1−P2), however this can be dealt by setting the first stationary ring 41 being pressed to the rotary ring 30 which is against the force F1 and the force (F3−F2).

Also, as shown in FIG. 4, in case of P1<P2, the O ring 45 moves in the inside of the O ring groove 45a and is pressed to the step form wall face of the first stationary ring side adaptor 103 due to the pressure P2. Therefore, at the first stationary ring side adaptor 103, the force F1', wherein the pressure difference (P2−P1) multiplied by the cross sectional area A1' corresponding to the radial direction width from the balance line BL (or BL1) to the outer peripheral face for O ring contact 44 having a step form, acts towards the direction compressing to the bellows part 101. The spring force Fs of the spring 120 is designed so that the spring 120 is larger than the force F1; hence there is no problem in this regard.

Also, at the first stationary ring 41, the force F2' (=F1'), wherein the pressure difference (P2−P1) is multiplied by the cross sectional area A2' (=A1') corresponding to the radial direction width from the balance line BL (or BL1) to the outer peripheral face for O ring contact 44 having a step form, acts so that the first stationary ring 41 is compressed towards the rotary ring 30.

Note that, at the sliding face between the seal face 43 and the seal face 32, the force acting in a direction to release the first stationary ring 41 from the rotary ring 30 is acting by the force F3' which is provided by the equation of S1×(P2−P1)/2, taking the area S1 of the seal face having a smaller area than the seal face 32 as the standard. As discussed in above, the force F2' and the force F3' are approximately the same, and depending on the pressure difference (P1−P2), there may be no force of the axis direction acting on the first stationary ring 41.

As shown in FIG. 4, the same applies even in case the balance line changes to the inner peripheral direction. This is because, if the balance line BL changes towards the inner peripheral direction and is at the position of balance line BL2, the area A1' becomes smaller thus the increased pressure difference (P1−P2) can be canceled out, hence the force F1' does not change significantly between the before and after the balance line changes.

Regarding the force F2', it does not change significantly between before and after the balance line change due to the same reason. Only the force F3 changes to increase in correspondence to (P2−P1), however this can be dealt by setting the first stationary ring 41 so that it is pressed to the rotary ring 30 which is against the force F1' and the force (F3'−F2').

That is, even in case of P1>P2 as shown in FIG. 3, and in case of P1<P2 as shown in FIG. 4, the present embodiment can correspond in a same manner, and there is no need to significantly change the structure of the mechanical seal device. Note that, the pressure of the intermediate room 18 may be determined accordingly depending on the usage and purpose of the seal device 1, and the type of the sealed fluid or so.

Also, in the present embodiment, the spring force to press the first stationary ring 41 to the rotary ring 30 by the first bellows part 101 alone is not necessary, and the first bellows part 101 can be attached in a condition near the free length. That is, since the number of the ridges of the first bellows part 101 can be reduced, the production cost can be reduced. Also, the mechanical device 1 can be made compact. The number of the ridges of the bellows part 101 may be 3 to 5, however it is preferably 4. Also, by making the bellows part 101 by metal, the corrosion of the bellows part 101 by the special liquids such as chemical agents or so can be prevented.

In the seal device 1 of the present embodiment, the rotary ring 30 and the stationary ring 41 (the stationary ring 51) are made from the material such as silicon carbide, carbon, cemented carbide or so respectively. Preferably, the combination of the stationary ring 41 (or the stationary ring 51) and the rotary ring 30 is respectively a combination of silicon carbide (SiC) and silicon carbide (SiC), a combination of carbon and silicon carbide (SiC), a combination of cemented carbide and cemented carbide, or a carbon and cemented carbide or so.

As such, in the seal device 1 of the present embodiment, without using the inter space of the stuffing box 80, the double mechanical seal device can be accomplished by the seal device of cartilage type. Therefore, according to the seal device 1 of the present embodiment 1, regardless of the size of the stuffing box 80, the double seal can be mounted easily to the desired device without making special design or modifying the device side such as the pump or so.

Note that, the aforementioned embodiment is to make the understanding of the present invention easier, and the present invention is not to be limited thereto. Each element disclosed in the present embodiment includes all the design modification and the equivalents within the scope of the present invention, and also arbitrary various modifications are possible.

For example, the shape and the arrangement constitution of the stationary ring 41 and the stationary ring 51 can be changed. For example, in the above mentioned embodiment, the balance value of the bellows part is about 50%; however it may be slightly changed. For example, the effect substantially the same as the present embodiment can be obtained as long as the balance value is within the range of 35% to 65%. Hence there is no problem to carry out as such embodiment.

Also, for the method of changing the balance line, the structure of the place of setting the bellows part 101 (or 111)

and the O ring 45 or so can be changed, and the face width of the seal face 43 (or 53) or the position of the setting place in the radial direction can be changed.

Also, in the aforementioned embodiment, the first mechanical seal 40 and the second mechanical seal 50 symmetrically arranged the stationary ring with the same constitution in the axis direction by taking the rotary ring 30 as the symmetric axis. However, the constitution of the first stationary ring 41 and the second stationary ring 51 may be different. For example, in case using the seal device 1 in the atmosphere, the intermediate room 19 side will constantly be high pressure for the second stationary ring 51, and for the second mechanical seal 50 of the outer device side, the balance value may be changed to 50% as there is no need to correspond to the positive pressure nor to the negative pressure. Also, only the second mechanical seal 50 may be constituted without the bellows seal device.

INDUSTRIAL APPLICABILITY

The present invention can be used as the seal device of the rotary shaft to the arbitrary machine comprising the rotary shaft. For example, it may be used to the centrifugal pump, the compressor, and the shaft seal for the stirrer or so.

NUMERICAL REFERENCES

1 . . . Double mechanical seal
10 . . . Seal cover
10c . . . First inner projection part
10d . . . Second inner projection part
30 . . . Rotary ring
32 . . . Inner device side rotating seal face
33 . . . Outer device side rotating seal face
40 . . . First mechanical seal
41 . . . First stationary ring
43 . . . First stationary seal face
45 . . . First stationary ring side O ring (seal material)
50 . . . Second mechanical seal
51 . . . Second stationary ring
53 . . . Second stationary seal face
55 . . . Second stationary ring side O ring (seal material)
100 . . . First bellows device
101 . . . First bellows part
102 . . . First cover side adaptor
103 . . . First stationary ring side adaptor
110 . . . Second bellows device
101 . . . Second bellows part
102 . . . Second cover side adaptor
103 . . . Second stationary ring side adaptor

The invention claimed is:

1. A double mechanical seal device comprising,
a rotary ring provided with a rotary shaft so as to rotate as one body with said rotary shaft, and having first and second rotating seal faces formed along an axial direction,
a first stationary ring provided at the first rotating seal face side of said rotary ring, and formed with a first stationary seal face sliding against said first rotating seal face at the first rotating seal face side of said rotary ring,
a second stationary ring provided at the second rotating seal face side of said rotary ring, and formed with a second stationary seal face sliding against said second rotating seal at the second rotating seal face side of said rotary ring, and
a seal cover attached to an outer face of an installation having said rotary shaft penetrating therethrough, and housing said first stationary ring, said rotary ring, and said second stationary ring at an inner peripheral side; wherein
a first bellows seal equipment is provided between said first stationary ring and said seal cover,
wherein said first bellows seal equipment comprises:
a first axially extendable bellows part,
a first cover side adaptor to which one end of said first bellows part is fixed in a liquid sealed manner, and which is installed in a liquid sealed manner to a first inner projection part of said seal cover via a first cover side seal member, and
a first stationary ring side adaptor to which a second end of said first bellows part is fixed in a liquid sealed manner, and which is installed against said rotary ring in liquid sealed manner via a first stationary ring side seal member so that the first stationary ring side adaptor can make a relative movement in an axial direction; and wherein
said first bellows and said first stationary ring are arranged so that a balance line of said first bellows part passes through said first stationary ring while there is no pressure difference generated between an inside and an outside of said first bellows part, and
wherein said first bellows seal equipment and said first stationary ring are arranged so that said balance line of said first axially extendable bellows part passes through a cross section of said first stationary ring side seal member while there is no pressure difference generated between the inside and the outside of said first axially extendable bellows part.

2. The double mechanical seal device as set forth in claim 1, wherein a width in a radial direction of said first stationary seal face is narrower than a width in a radial direction in the said rotating seal face.

3. The double mechanical seal device as set forth in claim 1, wherein a spring is arranged outside of said first bellows part, and is arranged in between said first stationary ring side adaptor and said first inner projection part to provide a force pressing the first stationary seal face of said first stationary ring axially toward the rotary ring via said first stationary ring side adaptor.

4. The double mechanical seal device as set forth in claim 1, wherein a second bellows seal equipment is provided between said second stationary ring and said seal cover,
wherein said second bellows seal equipment comprises:
a second bellows part extendible in the axial direction,
a second cover side adaptor to which one end of said second bellows part is fixed in a liquid sealed manner, and which is installed to a second inner projection part of said seal cover in a liquid sealed manner via a second cover side seal member, and
a second stationary ring side adaptor attached to an other end of said second bellows part, and installed to said second stationary ring in a liquid sealed manner via a second stationary ring side seal member so that the second stationary ring side adaptor can make relative movement in the axial direction; and
wherein said second bellows part and said second stationary ring are arranged so that a balance line of said second bellows part passes through said second stationary seal face while there is no pressure difference generated between an inside and an outside of said second bellows part.

* * * * *